(12) United States Patent
Karamanolis et al.

(10) Patent No.: US 7,761,875 B2
(45) Date of Patent: Jul. 20, 2010

(54) WEIGHTED PROPORTIONAL-SHARE SCHEDULER THAT MAINTAINS FAIRNESS IN ALLOCATING SHARES OF A RESOURCE TO COMPETING CONSUMERS WHEN WEIGHTS ASSIGNED TO THE CONSUMERS CHANGE

(75) Inventors: Christos Karamanolis, Los Gatos, CA (US); Magnus Karlsson, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1440 days.

(21) Appl. No.: 11/151,159

(22) Filed: Jun. 10, 2005

(65) Prior Publication Data

US 2006/0280119 A1 Dec. 14, 2006

(51) Int. Cl.
*G06F 9/46* (2006.01)
*H04L 12/26* (2006.01)

(52) U.S. Cl. .................. 718/102; 718/103; 718/104; 718/105; 370/235

(58) Field of Classification Search ......... 718/102–105; 370/235
See application file for complete search history.

(56) References Cited

U.S. PATENT DOCUMENTS

| | | | |
|---|---|---|---|
| 7,257,083 B2 * | 8/2007 | Bansal et al. | 370/235 |
| 2004/0153564 A1 * | 8/2004 | Lakkakorpi | 709/232 |
| 2004/0230675 A1 * | 11/2004 | Freimuth et al. | 709/223 |
| 2006/0079979 A1 * | 4/2006 | Giebels et al. | 700/96 |

OTHER PUBLICATIONS

"Interposed Proportional Sharing for a Storage Service Utility", Jin, Wei et al., pp. 1-13, 2004.
"Yaksha: A Self-Tuning Controller for Managing the Performance of 3-Tiered Web sites", Abhina Kamra et al., 2004.
"Self-Optimization in Computer Systems via Online Control: Application to Power Management", Nagarajan Kandasamy, 2004.
"Triage: Performance Isolation and Differentiation for Storage Systems", Karlsson, Magnus et al., 2004.
"An Adaptive Optimal Controller for Non-Intrusive Performance Differentation in Computing Services", Karlsson,Magnus et al., 1998.
"An Adaptive Control Framework for QoS Quarantees and its Application to Differentiated Caching Services", Lu, Ying, pp. 1-20, 2002.

(Continued)

*Primary Examiner*—Meng-Ai An
*Assistant Examiner*—Camquy Truong (57) ABSTRACT

According to one embodiment, a method comprises receiving at a scheduler a change to a weight assigned to a consumer. The method further comprises utilizing, by the scheduler, a weighted proportional-share scheduling algorithm to maintain fairness in allocating shares of a resource to competing consumers in accordance with the changed weight. According to another embodiment, a system comprises at least one resource, and a plurality of competing consumers desiring to use the resource(s). A scheduler allocates shares of the resource(s) to the competing consumers according to a weighted proportional-share algorithm. A controller monitors at least one of performance of the competing consumers and utilization of the resource(s), and controls the performance and/or utilization by dynamically changing a scheduler parameter. The scheduler maintains fairness in allocating shares of the resource(s) to the competing consumers in accordance with the dynamically changed scheduler parameter.

22 Claims, 3 Drawing Sheets

OTHER PUBLICATIONS

"Facade: virtual storage devices with performance guarantees", Lumb, Christopher R. at al., 2003.

"Throttling Utilities in the IBM DB2 Universal Database Server", IBM Research Report, Parekh, Sujay, pp. 1-6, 2004.

"Performance Guarantees for Web Server End-Systems: A Control-Theoretical Approach", Abdelzaher, Tarek F. et al., pp. 80-96, 2002.

"Design and evaluation of load control in web server systems", Proceedings of the 2004 American Control Conference, A. Robertsson et al., pp. 1980-1985.

"Resource Overbooking and Application Profiling in Shared Hosting Platforms*", Urgaonkar, Bhuvan et al., 2002.

"RepStore: A Self-Managing and Self-Tuning Storage Backend with Smart Bricks", Proceeedings of the Internationanl Conference on Automic Computing (ICAC '04), Zhang, Zheng et al., 2004.

"Performance virtualization for large-scale storage systems", Proceedings of the 22nd International Symposium on Reliable Distributed Systems (SRDS '03), Xu, Jian et al., 2003.

"Managing Energy and Server Resources in Hosting Centers", Chase, Jeffrey S. et al., 2003.

"Correlating instrumentation dat a to system states: A building block for automated daignosis and control", Cohen, Ira et al., 2004.

"Articulated-pose estimation using brightness- and depth-constancy constraints", Covell, Michele M. et al., 1999.

"Calibration and Prediction of Streaming-Server Performances", Covell, Michele et al., 2004.

"Differentiated and Predictable Quality of Service in Web Server Systems", Thesis, Aron, Mohit, pp. 1-126, 2000.

"Hierarchical Packet Fair Queing Algorithms", IEEE/ACM Transactions on Networking, vol. 5, No. 5, Oct. 1997, Bennett, Jon C. R. et al., pp. 675-689.

"WF2Q: Worst-case Fair Weighted Fair Queueing", IEEE 1996, Bennett, Jon C.R. et al., pp. 120-128.

"Xen and the Art of Visualization", Barham, Paul et al., 2003.

"Resource containers: A new facility for resource Management in server systems*", Banga, Gaurav et al., 1999.

"Lottery Scheduling: Flexible Proportional-Share Resource Management", Waldspurger, Carl A. et al., 1999.

"A Practical Learning-Based Approach for Dynamic Storage Bandwith Allocation*", Sundaram, Vijay et al., 2003.

"Latency_Rate Servers: A General Model for Analysis of Traffic Scheduling Algorithms", Stiliadis, Dimitrios et al., IEEE/ACM Transactions on Networking, vol. 6, No. 5 Oct. 1998, pp. 611-624.

"Hippodrome: running circles around storage administration", Anderson, Eric et al., Conference on File and Storage technologies (FAST'02), pp. 175-188, 2002.

"Cello: A Disk Scheduling Framework for Next Generation Operating Systems", Shenoy, Prashant J., pp. 1-13, 1998.

"Integrated Resource Management for Cluster-based Internet Services", Shen, Kai et al., USENIX Association, pp. 225-238, 2002.

"On Maximizing Service-Level-Agreement Profits", Liu, Zhen et al., pp. 213-223, 2001.

"SoftUDC: A Software-Based Data Center for Utility Computing", Kallahalla, Mahesh et al., 2004 IEEE, pp. 38-46.

"User-Level QoS-Adaptive Resource Management in Server End-Systems", Abdelzaher, Tarek et al., pp. 1-18, 2003.

"How Fair is Fair Queuing", Greenberg, Albert G. et al., Journal of the Association for Computing Machiner, vol. 39, Jul. 1992, pp. 568-598, 1992.

"Start-time Fair queing: A Scheduling Algorithm for Intergrated Services Packet Switching Networks", Goyal, Paw an et al., pp. 1-12, 1997.

"A hierarchical CPU Scheduler for Multimedia Operating Systems", Goyal, Paw an et al., 1996.

"A Self-Clocked Fair queueing Scheme for Broadband Applications", Golestani, S. Jamaloddin, 1994 IEEE, pp. 636-646.

"Analysis and Simulation of a Fair queueing Algorithm", Demers, Alan et al., Computer Communication Review, pp. 1-14, 1989.

"A simulation Study of Fair Queueing and Policy Enforcement", Davin, James R. et al., pp. 23-29, 1990.

* cited by examiner

WEIGHTED PROPORTIONAL-SHARE SCHEDULER THAT MAINTAINS FAIRNESS IN ALLOCATING SHARES OF A RESOURCE TO COMPETING CONSUMERS WHEN WEIGHTS ASSIGNED TO THE CONSUMERS CHANGE

CROSS-REFERENCE TO RELATED APPLICATIONS

Not Applicable.

FIELD OF THE INVENTION

The following description relates generally to resource allocation, and more specifically to a system and method for allocating resources to competing consumers according to a weighted proportional-share algorithm, wherein weights assigned to the consumers dynamically change.

DESCRIPTION OF RELATED ART

Various systems exist in which allocation of resources are managed by a scheduling system. For instance, shares of resources may be allocated, by a scheduler, to various competing consumers (e.g., workloads) in attempt to satisfy performance goals of the consumers. That is, the consumers may be considered as "competing" because they all desire use of the resource, and the scheduler may allocate shares of utilization of such resource among the consumers. The scheduler may use some algorithm for determining an appropriate share of the resource to allocate to each consumer at any given time, such as a weighted proportional-share algorithm described further below. The performance goals of consumers, such as response time bounds and minimum throughput requirements, are typically expressed in the form of Service Level Agreements (SLAs). The performance level achieved by consumers may be controlled by varying the shares of resources available to each consumer. Proportional-share schedulers are known in the art for controlling the shares of resources that are allocated to consumers. Proportional-share schedulers are most commonly implemented using variants of Weighted Fair Queuing (WFQ). The use of WFQ schedulers for meeting SLAs is based on the premise that the performance of a workload varies in a predictable way with the amount of resources available to execute it.

WFQ schedulers have been used to ensure sharing of a computing resource or "service" (e.g., network link, CPU, file server, etc.) in proportion to an explicitly specified "weight" for each of the "flows" (or "consumers") that compete for the resource. In this regard, a "flow" refers to a sequence of tasks (network packets, instructions, I/O requests, etc.) that are using the shared resource(s). Because each flow desires use of the shared resource(s), a flow may be considered as a "resource consumer." Weights can be assigned to each consumer (e.g., each flow) to define respective priorities for allocating resource access among various competing consumers. Existing WFQ schedulers are "fair" in the sense that active flows share the available resource capacity proportionally to their weights, within some tolerance that is bounded by a constant over any time interval. However, traditional WFQ scheduling algorithms assume that flow weights are fixed (or "static") over time. Such traditional WFQ scheduling algorithms cannot ensure fairness when weights are adjusted dynamically.

Weight adjustment may be desired from time-to-time in certain computing systems, such as in computing systems where specified performance goals have to be met for each flow and/or where effective utilization of shared resource(s) is desired. In the general case, the performance of a flow varies in a predictable way with the amount of resources available to execute it. Flow weights may thus be adjusted dynamically to adapt to system and workload dynamics, so that performance goals are met and the service resources are effectively utilized.

Service providers and enterprises are increasingly hosting services and applications on shared pools of computing and storage resources. For example, in many enterprises, shared network storage servers meet the storage demands of different departments in the organization. Multiplexing workloads onto a shared utility infrastructure allows for on-demand assignment of resources to workloads; this can improve resource efficiency while protecting against unplanned demands and service outages.

A key problem in such environments is to manage the shared resources in a way that meets the performance desires of the consumers (which may be defined in SLAs), while maximizing the utilization of the shared resources. Utility services deploy resource control mechanisms that arbitrate the use of the shared resources to comply with the SLAs of different customer workloads. Depending on the service, consumers (e.g., workloads) may compete for either physical resources (CPU cycles, disk I/O, network bandwidth, etc.) or virtual resources (web server bandwidth, database transactions per second, etc.). Resource control mechanisms include admission control of workloads, throttling or scheduling the demand of individual workloads, and/or changing the configuration of resources such as disks. In various such systems, it may be desirable to adjust flow weights dynamically to adapt to system and workload dynamics so that performance goals are met and the shared resources are effectively utilized.

However, traditional WFQ schedulers have been unsuitable for use in systems in which weights dynamically change. That is, traditional WFQ schedulers fail to properly manage resource allocation in systems in which weights dynamically change. Traditional WFQ schedulers exhibit unpredictable behavior when the weights assigned to consumers change dynamically: they cannot effectively enforce the required weights. Accordingly, fair queuing has been uncontrollable in systems in which weights change dynamically. Thus, a desire exists for a system and method for providing controllable fair queuing in a system in which weights dynamically change.

DETAILED DESCRIPTION OF THE INVENTION

We have recognized, as discussed further below, that fairness properties commonly defined for proportional-share schedulers using WFQ are not preserved across changes to the relative weights of competing request flows. As a result, conventional WFQ schedulers are not controllable by a resource controller that adapts by adjusting the weights. Embodiments of the present invention, however, define controllable fairness properties and provide an algorithm to adjust any WFQ scheduler when the weights change.

Figure 1:
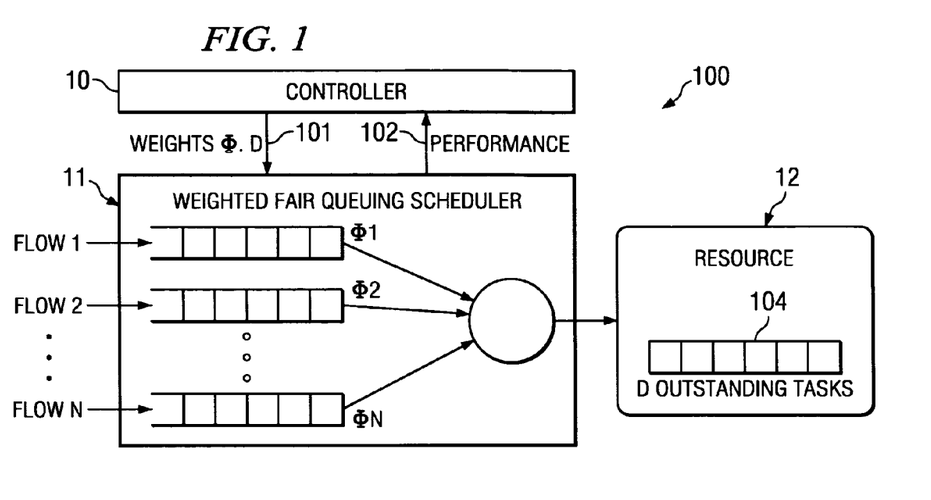
FIG. 1 shows an exemplary system in which embodiments of the present invention may be employed.

FIG. 1 shows an exemplary system 100 in which embodiments of the present invention may be employed. More specifically, exemplary system 100 is a closed-loop system comprising a shared resource 12, proportional-share scheduler 11, and controller 10. Proportional-share scheduler 11, in this example, utilizes a WFQ algorithm for allocating shares of resource 12 to requesting flows 1-N. Controller 10 monitors performance 102 of the requesting flows (e.g., to determine whether their respective performances are satisfying their respective performance goals, as may be defined by an SLA), and dynamically changes scheduler parameters 101, including weights "$\phi$" assigned to the flows. Flows 1-N are each a sequence of tasks (network packets, instructions, I/O requests, etc.) that are using the shared resource 12. Flows 1-N are thus examples of competing "resource consumers" because they consume some share of resource 12 for performing their respective tasks. Blocks 104 within resource 12 represent the total number of requests/tasks inside the system at a given time. The number of these taken by a specific flow is dependent on the flow's weight setting.

Thus, system 100 provides an exemplary closed-loop system comprising a weighted proportional-share scheduler 11 that is used for resource allocation to requesting resource consumers (flows 1-N), wherein the weights $\phi$ assigned to the resource consumers may be dynamically adjusted by controller 10 in attempt, for example, to achieve performance goals of the resource consumers and/or effectively utilize shares of shared resource 12. In this example, the typical weighted proportional-share algorithm, WFQ, is used by scheduler 11. While much of the description provided herein is directed to the WFQ algorithm, as such algorithm is a common weighted proportional-share algorithm, embodiments of the present invention are not limited in application to WFQ, but may likewise be applied to any other weighted proportional-share algorithm now known or later developed. Controller 10 may be implemented to autonomously adjust the scheduler parameters 101 (e.g., weights $\phi$) based on the received performance 102, or in certain embodiments controller 10 may be implemented to output performance 102 to a user and/or receive input from a user to dynamically adjust the scheduler parameters 101. Thus, the scheduler parameters may be dynamically adjusted autonomously by controller 10 or manually via user input. Embodiments of the present invention are not intended to be limited with regard to how scheduler parameters are modified within a given system, and are directed to techniques for adapting the weighted proportional-share scheduler to changed scheduler parameters in a manner that maintains fairness, i.e., maintains allocation of resource shares to the competing consumers (flows 1-N) proportionally to their respective weights (within some tolerance that is bounded by a constant over any time interval). As described further herein, according to certain embodiments of the present invention a modified "controllable" WFQ algorithm is employed by scheduler 11, which is operable to maintain fairness properties when weights dynamically change.

Figure 2A:
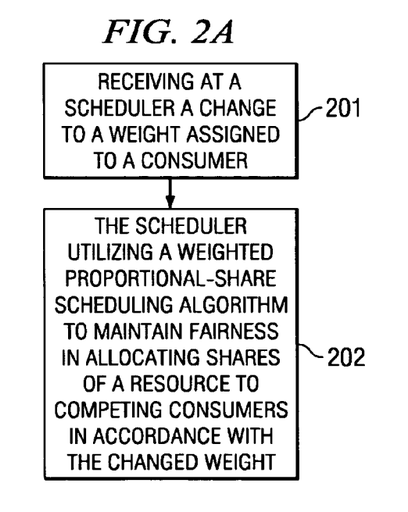
FIGS. 2A-2B show exemplary operational flow diagrams according to certain embodiments of the present invention.

FIGS. 2A-2B show exemplary operational flow diagrams according to embodiments of the present invention. FIG. 2A shows a first exemplary operational flow diagram of a scheduler, such as scheduler 11 of FIG. 1, according to one embodiment of the present invention. In operational block 201, the scheduler receives a change to a weight assigned to a consumer. As described above with FIG. 1, such change may be received from a controller 10. In operational block 202, the scheduler utilizes a weighted proportional-share scheduling algorithm (e.g., WFQ) to maintain fairness in allocating shares of a resource to competing consumers in accordance with the changed weight. As described further herein, unlike traditional weighted proportional-share schedulers, embodiments of the present invention provide a weighted proportional-share scheduler that is capable of maintaining fairness even when weights change dynamically. According to one embodiment, a weighted proportional-share scheduling algorithm is provided that adapts its internal state (e.g., "tags," as discussed further below) to maintain, within a defined tolerance that is bounded by a constant over any time interval, allocation of shares of the resource to the competing consumers proportionally to respective weights assigned to the competing consumers. Thus, as the weights assigned to the competing consumers change, the weighted proportional-share scheduling algorithm adapts its internal state to those changes in a manner such that the scheduler continues to fairly allocate shares of the resource to the competing consumers in proportion to their newly specified weights.

Figure 2B:
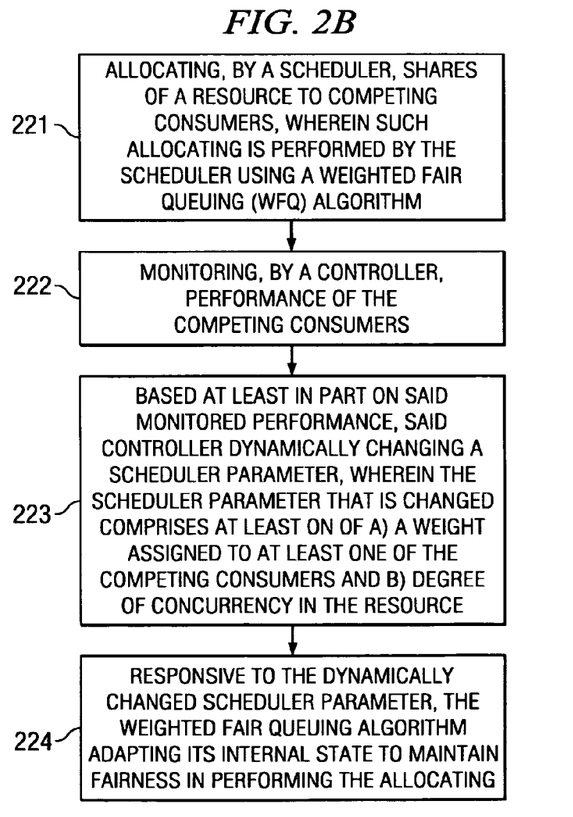

FIG. 2B shows a more detailed exemplary operational flow diagram of a system in which an embodiment of the present invention is implemented, such as system 100 of FIG. 1. In operational block 221, shares of a resource 12 are allocated by a scheduler 11 to competing consumers (e.g., flows 1-N), wherein such allocating is performed by the scheduler using a WFQ algorithm. In operational block 222, a controller 10 monitors performance 102 of the competing consumers (flows 1-N). In operational block 223, based at least in part on the monitored performance 102, the controller 10 dynamically changes a scheduler parameter 101, wherein the scheduler parameter that is changed comprises at least one of a) a weight $\phi$ assigned to at least one of the competing consumers and b) degree of concurrency (D) in the resource 12. In operational block 224, responsive to the dynamically changed scheduler parameter 101, the WFQ algorithm adapts its internal state (e.g., tags) to maintain fairness in performing the allocating of shares of resource 12 to the competing consumers.

One exemplary environment in which embodiments of the present invention may be usefully employed is a utility service environment. A utility service comprises an ensemble of computing resources (servers, disks, network links, etc.) that are shared by multiple customers with contractual performance assurances (SLAs). SLAs contain statistical performance goals, expressed in terms of averages or percentiles over certain time intervals. Examples of utility services include servers shared by different competing applications or by multiple virtual machines, shared storage systems or shared clusters hosting a multi-tier Internet application for each customer. That is, as described further herein, the WFQ scheduler adapts its internal state (or "tags") to maintain fairness in accordance with the new scheduler parameters (e.g., new weights).

In such utility service environments, a number of customer workloads compete for access to some shared physical or virtual resources. One objective of a utility service is to control the rates by which different workloads consume resources so that the SLAs of the customers are met while maximizing the utilization of the shared resources.

Utility schedulers may be employed in such utility service environments for adjusting the performance of a workload by controlling the resources available to execute such workload. While the specific application may vary from one environment to the next (e.g., depending on the specific types of consumers and/or resources being controlled), the typical environment can be generalized as shown in FIG. 1. The computational unit of resource consumption is referred to herein as a task. Examples of tasks include, without limitation, I/O (input/output) operations reaching a disk, threads competing for a CPU (central processing unit), network packets sent over a link, and application-level requests (e.g., http requests) sent to an Internet service. Tasks may be grouped into service classes referred to herein as flows. For instance, gold, silver, and bronze service classes may be defined, with each class having a different performance guarantee. Examples of flows include all the I/O operations accessing a given storage volume, the requests for CPU cycles of a specific virtual machine on a host, and all http requests of the "gold" clients of a Web application. The weights assigned to each flow may vary based at least in part on their respective service class and also on the performance experienced from the system, faults, etc. Of course, embodiments of the present invention are not limited in application to systems in which a plurality of different service classes are defined, but may likewise be employed for systems in which all consumers have the same service class.

The objective of a proportional-share scheduler 11, in general, is to limit the resource consumption of each flow f in proportion to a weight $\phi_f$ assigned to it. If flow weights are normalized to sum to one, then each weight may be interpreted as representing a share of the resources 12. The weights enforce the property of performance isolation: they prevent load surges in any flow from unacceptably degrading the performance of another. Thus, weights should be set (via controller 10) to the appropriate values that result in satisfying the performance desires (e.g., SLAs) of the different flows. The premise is that the performance of a flow improves when increasing its share of resources. Another factor that affects performance is the degree of concurrency D in the resource. In general, higher concurrency results in higher aggregate throughput and resource utilization, but also higher response latencies. Thus, D is another scheduler parameter that can be tuned (via controller 10) to meet flow SLAs, in certain embodiments.

According to one embodiment, WFQ scheduler 11 has a property known as work conservation. In contrast to guaranteed reservations, which ensure a minimum allotment of resource to each flow even when the flow has low load, a work-conserving proportional-share scheduler shares surplus resources among active flows in proportion to their configured weights. A flow may receive more than its configured share unless the system is fully loaded and all competing flows are active, i.e., they have backlogs of queued tasks. An advantage of work-conserving schedulers, that makes them very popular in practice, is that they use resources more efficiently and improve the performance of active flows, when the system is lightly loaded. These properties limit the need for fine-grained adjustments in the weights to accommodate bursty demand.

The flow weights $\phi$ and the degree of concurrency D are, in the exemplary system 100 of FIG. 1, continuously adjusted by controller 10 in response to observable performance metrics 102 (e.g., response latency, throughput or bandwidth) obtained by each flow. A challenge, in this case, is to derive the desirable properties for the resulting closed-loop system; namely, that it is stable (does not oscillate) and that it achieves the desirable performance goals. Control theory provides an ideal framework for the systematic design of dynamically controlled systems. Rather than requiring that a new controller be designed, certain embodiments of the present invention may be employed with well-understood, off-the-shelf controllers.

One of the most widely used control algorithms in the industry is the Self-Tuning Regulator (STR). The term "self-tuning" comes from the fact that the controller parameters are automatically tuned to obtain the desired properties of the closed-loop system. An STR may be employed as controller 10 in certain embodiments. Such STRs may be desirable in certain systems for at least two reasons. First, the design of closed-loop systems involves many tasks such as modeling, design of control law, and implementation. STR controllers aim at automating these tasks. Thus, they can be used out-of-the-box for many practical cases. Second, existing research has shown that, in the general case, adaptive controllers, such as STRs, may be used to trace the varying behavior of systems and their changing workloads. An STR, in general, has two main parts: 1) a model estimator and 2) a control law module. In an exemplary embodiment of the present invention, the estimator estimates how much the performance of a flow will change as a function of weight setting. The control law computes the weight settings given a model and a set of performance goals.

There are several ways of specifying the goals of an STR. In one exemplary implementation, the goals may be formulated as an optimization problem: it is desirable to minimize the deviations from the specified SLAs without too large variations to the weight values that would give rise to oscillations in the system. Thus, the following linear quadratic (LQR) objective function can be defined, which the controller aims at minimizing in one embodiment:

$$\min \{\|p(i+1)-p_{ref}(i+1)\|^2+\|\phi(i)-\phi(i-1)\|^2\} \quad (1)$$

Here, p(i) is the vector of the performance measurements at time i (one measurement per flow), $p_{ref}(i)$ is the vector of performance goals, and $\phi$ (i) is a vector of settings of scheduler parameters (weights and D). The variables in equation (1) can be weighted to prioritize among flows when the resource cannot meet the demand of all flows; but priorities are not discussed further here for simplicity. A discrete time model can be used for the design and analysis of the closed-loop system. The sampling period used in the system, i.e., the time between any two consecutive measurements and weight settings, is a tunable design parameter. It is typically identified by experimental means.

The control law of a STR (how the values of weights are set) can be analytically derived from the proposed objective function and the estimated system model at every sampling period, as described in the well-known control theory literature. It should be recognized that the exemplary approach provided herein to formulate the controller goals as an optimization problem is generally applicable to a number of problems in computer utilities, not only compliance with performance SLAs. STRs are one example of standard adaptive controllers that can be used off-the-shelf to solve control problems such as the problem of dynamically adjusting the flow weights in a scheduler. But it is not the only type of such controllers. Thus, for system designers, the problem is not how to design controllers, but instead how to design systems that are amenable to control. A problem addressed by embodiments of this invention is how to design a specific type of system (or component of a system), namely a scheduler, that is amenable to control.

Using off-the-shelf controllers is clearly a desirable option for the systems designers, who are not usually experts in control theory. Thus, the key question is whether existing computer systems are amenable to dynamic control by "standard" controllers. Exemplary embodiments of the present invention address the properties of fair-queuing schedulers so that they can be used in conjunction with an off-the-shelf STR controller. Control theory has come with a list of properties that the controlled system should satisfy:

C.1. The system's behavior should be sufficiently approximated by a linear model. This model should have low variance over time and the relation between actuators and observed behavior should be monotonic in average.

C.2. The system should have a known reaction delay to actuation. That is, there is a known time lag between changing some parameters (e.g., flow weights in our case) and observing the effects of that change.

C.3. Recent actuations should have higher impact than older ones to the behavior of the system. This implies that the effects of an actuation can always be corrected or canceled by another, later actuation.

The above properties apply to the case of STR controllers, but similar properties eist for other types of standard adaptive controllers.

Regarding property C.1, we have seen in practice that a linear model provides a good local approximation for the relation between weights and observed performance, given a period for system sampling that is sufficiently long to avoid quantization effects but short enough to trace system dynamics. Moreover, this relation is indeed monotonic in average over long periods of time. However, as discussed further below, existing WFQ schedulers do not satisfy the low variance property, as well as properties C.2 and C.3. As a result, native WFQ algorithms are not controllable—they result in unstable systems that do not converge to the desired performance goals as our experimental evaluation described further below shows. Embodiments of the present invention provide a variation of WFQ, which, as described further below, is controllable. Again, while WFQ is described in detail herein as one exemplary weighted proportional-share algorithm, the concepts of the present invention may be readily employed in a similar manner with other types of weighted proportional-share algorithms that are now known or later developed in order to maintain fairness with changing weights.

Description of WFQ Scheduling Algorithms

Many variants of WFQ scheduling algorithms have been developed and extensively studied in the literature. They are all designed following the same principles. Each flow f comprises a sequence of tasks $p_f^o \ldots p_f^n$ arriving at the server. Each task $p_f^i$ has an associated cost $c_f^i$ bounded by a constant $c_f^{max}$. For example, the tasks may be packets of varying lengths or tasks of varying costs. Fair queuing allocates the throughput of the resource in proportion to weights assigned to the competing flows. The weights may represent service rates, such as bits or cycles or tasks per second, as examples. Only the relative values of the weights are significant, but it is convenient to assume that the weight $\phi_f$ for each flow f represents a percentage share of resource throughput, and that task costs are normalized to a resource throughput of one unit of cost per unit of time.

WFQ schedulers are fair in the sense that active flows share the available resource throughput proportionally to their weights, within some tolerance that is bounded by a constant over any time interval. Formally, if $W_f(i)$ is the aggregate cost of the tasks from flow f served during any time interval i, then a fair scheduler guarantees that:

$$\left| \frac{W_f(i)}{\phi_f} - \frac{W_g(i)}{\phi_g} \right| \leq U_{f,g} \qquad (2)$$

where f and g are any two flows continuously backlogged with tasks during i. Interval $i=|t_i, t_i)$ is the time period between the $i^{th}$ and $i+1^{th}$ sampling/actuation in the system. $U_{f,g}$ is a constant that depends on the flow weights and the maximum cost of flow tasks. All algorithms try to ensure low values of $U_{f,g}$, which indicates better fairness. Typically, fairness is defined on pairs of flows, but, of course, there may be more than two flows using a resource. In practice, good fairness implies that the performance of the different competing flows is a predictable function of their corresponding weights. Poor fairness, on the other hand, implies large variability in the relation between performance and weights, violating property C.1 described above.

WFQ schedulers dispatch tasks in order of tags assigned at task arrival time. When the $j^{th}$ task $p_f^j$ of flow f arrives, it is assigned a start tag $S(p_f^j)$ and a finish tag $F(p_f^j)$ as follows:

$$F(p_f^o) = 0 \qquad (3)$$

$$S(p_f^j) = \max(v(A(p_f^j)), F(p_f^{j-1})), \quad j \geq 1 \qquad (4)$$

$$F(p_f^j) = S(p_f^j) + \frac{c_f^j}{\phi_f}, \quad j \geq 1 \qquad (5)$$

where $A(p_f^j)$ is the arrival time of task $p_f^j$, $c_f^j$ is the actual cost for the resource to execute task $p_f^j$, and $\phi_f$ is the weight of flow f. For convenience, table 1 briefly summarizes the symbols used herein.

TABLE 1

| Symbol | Meaning |
| --- | --- |
| $\phi_f(i)$ | Weight of flow f during time interval i. |
| $p_f^j$ | The j-th task of flow f. |
| $c_f^j$ | Cost of task $p_f^j$. |
| $c_f^{max}(i)$ | Maximum cost for a task from flow f during time internal i |
| v(t) | Virtual time at time t |
| D(i) | The maximum number of outstanding tasks during time internal i |
| D'(i) | The actual number of outstanding tasks during time interval i |
| $A(p_f^j)$ | Arrival time of task $p_f^j$. |
| $S(p_f^j)$ | Start tag of task $p_f^j$ |
| $F(p_f^j)$ | Finish tag of task $p_f^j$ |
| $W_f(i)$ | Total amount of work/cost served from flow f during time internal i. |
| $U_{fg}(i)$ | The fairness bound during time internal i. |
| $U_{fg}$ | The controllable fairness bound over a sequence of time internals. |

The tags described above represent the times at which each task should start and finish according to a scheduler notion of virtual time v(t). Virtual time advances monotonically and is identical to real time under ideal conditions: all flows are backlogged, the resource completes work at a fixed ideal rate, task costs are accurate, and the weights sum to the resource throughput. In an idealized bit-by-bit fair round-robin scheduling algorithm, each active flow f receives $\phi_f$ bits of resource per unit of virtual time: v(t) speeds up when surplus resources are available to serve active flows at a higher rate. Calculating v(t) exactly is computationally expensive. In particular, the cost is generally prohibitive when the throughput of the resource fluctuates. WFQ algorithms differ primarily in the way that they approximate virtual time.

There are two WFQ algorithms that approximate v(t) efficiently by clocking the rate at which the resource actually completes work. Self Clocked Fair Queuing (SCFQ) and Start-time Fair Queuing (SFQ) approximate v(t) with (respectively) the finish tag or start tag of the task in service at time t. The main advantage of SFQ over SCFQ is that it reduces the maximum delay incurred for the processing of individual tasks, by scheduling tasks in increasing order of start tags. For simplicity, the following analysis of controllability for WFQ algorithms focuses on self-clocking algorithms, but the proofs are independent of how v(t) is computed. Thus, embodiments of the present invention are not limited in application to any particular WFQ algorithm.

All WFQ algorithms have well-defined fairness bounds. The best known WFQ algorithms, including WF2Q and the self-clocking algorithms SCFQ and SFQ have been shown to have a fairness bound that is:

$$U_{f \cdot g} = \left( \frac{c_f^{max}}{\phi_f} + \frac{c_g^{max}}{\phi_g} \right) \quad (6)$$

which is two times the theoretical lower upper bound for any fair queuing algorithm.

Most existing WFQ schedulers are designed for resources that handle one task at a time, such as a router's out-going link or a CPU, and so are not suitable for all computing resources (e.g., disk, multi-processors, file servers). A depth-controlled variant of SFQ, (SFQ(D)), has been proposed recently to deal with task scheduling in multi-tasking resources. The maximum concurrency D allowed in the resource reflects a trade-off between resource utilization and the worst-case fairness bound of the scheduler. In this case, $U_{f \cdot g}$ also depends on D.

Problems in Controlling WFQ Algorithms when Weights Dynamically Change

One problem for performance control with traditional WFQ schedulers is that, in the general case, certain share assignments do not result in predictable performance because of the dynamic nature of workloads and systems. Resource control mechanisms can use feedback from workload performance to dynamically adjust workload shares in the scheduler. A challenge, in this case, is to derive the desirable properties for the resulting closed-loop system; namely, that it is stable (does not oscillate) and that it quickly achieves the desirable performance goals. However, when used in tandem with an adaptive controller, traditional WFQ schedulers have failed to meet performance goals of workloads. Such an implementation of a closed-loop system becomes unstable and does not converge to the performance goals, even though there may exist sufficient resources in the system. One problem is that the obtained performance, given a weight setting, is not predictable. The cause is that the fairness property of the scheduler is not preserved across changes to the weights.

Figure 3A:
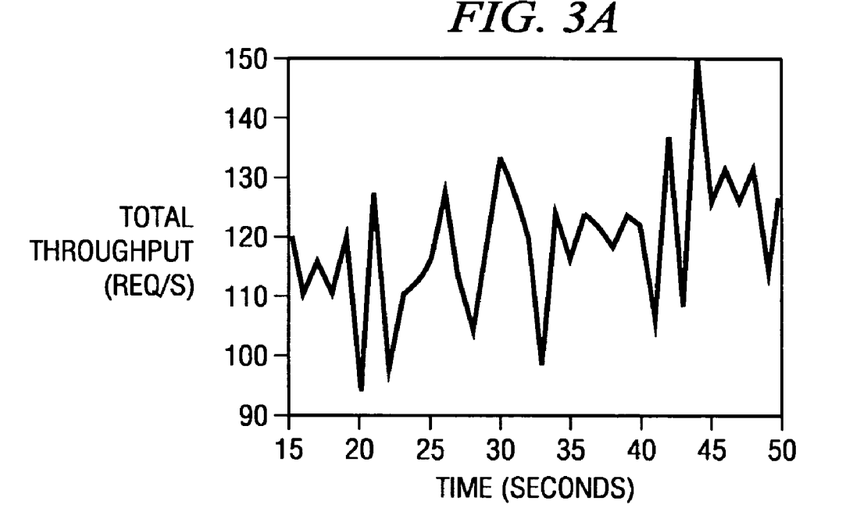
FIG. 3A shows a graph illustrating variation in total throughput over time for a typical workload of a 3-tier Web application.
Figure 3B:
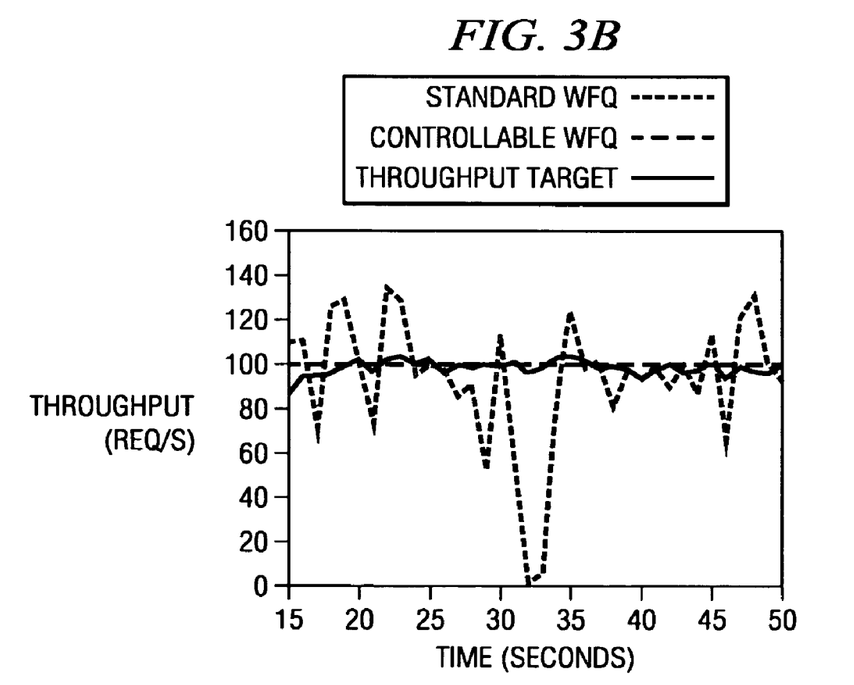
FIG. 3B shows a graph illustrating an example of such throughput when using an adaptive controller, and demonstrates that the goal is not reached with a standard WFQ scheduler but can be with a controllably-fair WFQ scheduler of an embodiment of the present invention.

FIG. 3A shows a graph illustrating exemplary variation in total throughput over time for a typical workload of a 3-tier Web application. FIG. 3B shows a graph illustrating an example of the throughput in the exemplary workload of FIG. 3A when using an adaptive controller, and demonstrates that the goal is not reached with a standard WFQ scheduler but can be with a controllably-fair WFQ scheduler of an embodiment of the present invention. Even in this static example where the system does not change (there is a fixed number of clients and they all run the same workload), fixed share assignments for the users result in widely oscillating throughput for each of them. Thus, it is desirable to utilize an adaptive controller for dynamically adapting weights of the consumers to achieve performance goals of the system. However, as discussed further below, the traditional WFQ scheduler does not maintain fairness as the weights assigned to the consumers change, and thus a desire exists for a controllably-fair WFQ scheduler as provided by embodiments of the present invention.

As explained further below, the fairness bounds proven for traditional WFQ algorithms do not hold when weights change dynamically. In fact, we prove that, in the general case, traditional WFQ algorithms cannot ensure any fairness bound under dynamic control of the weights. For the discussion below, we refer to WFQ algorithms that emulate v(t) by the start tag of the last submitted task (e.g., SFQ). The proofs are similar for algorithms that emulate v(t) by the finish tag of the last submitted task (e.g., SCFQ), but are omitted for brevity. The below discussion assumes, without loss of generality, that all tasks have unit cost.

Figure 4:
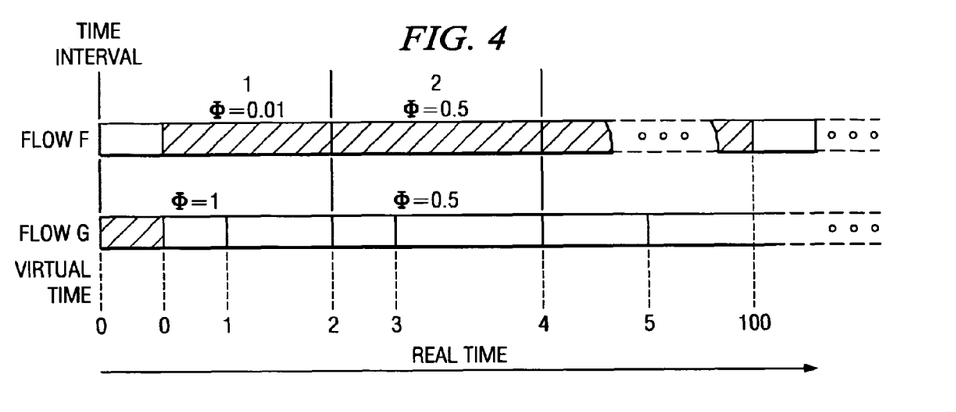
FIG. 4 shows graphs for an exemplary system having two continuously back logged flows, f and g, illustrating that when weights change in the traditional WFQ algorithm there exist intervals in which a flow receives no service independent of its weight setting.

The proven fairness bounds for traditional WFQ schedulers assume that flow weights are fixed over time. By the definition of interval, the values of flow weights do not change for the duration of an interval. However, when weights do change dynamically between intervals, i.e., $\phi_f(i) \neq \phi_f(i-1)$ for some flow f, then there may exist intervals in which a flow receives no service irrespectively of its weight setting. Consider the example of FIG. 4 with two continuously backlogged flows f and g. Suppose that during time interval $\phi_f=0.01$ and $\phi_g=1$, f has one task served, and the start tag of the next task is set to v(t)=100, as $S(p_f^2) = \max(0, 0+1/0.01) = 100$ according to equation (4) above. Flow g has the higher weight, so it has two tasks served. Thus, by the end of interval 1, v(t)=2. At the beginning of interval 2, the weights are changed to $\phi_f=0.05$ and $\phi_g=00.5$. Yet not a single task from f is processed, as $S(p_f^2)=100$, well ahead of v(t). In fact, even a $\phi_f=\infty$ would produce exactly the same result, as the start tag of the second task of f was computed using the weight during interval 1.

This counter example shows that, when flow weights change, there exist intervals during which the bound of equation (6) does not hold. In other words, fairness may be arbitrarily bad in any single interval. That is, flow performance may vary arbitrarily depending on past weight settings and flow activity. Thus, property C.1 discussed above is violated when using a traditional WFQ scheduler with dynamically changing weights.

The root cause of this problem is that the tags of the backlogged tasks are not adjusted in any way when the weights change. In order to improve the fairness of WFQ schedulers, the tags of backlogged tasks should thus be recomputed when weights change. One naive way of doing this would be to use equations (3)-(5) to recompute the tags of all backlogged tasks, every time the weights change. All flows would start with a clean slate ($F(p_f^0)=0$ for this interval. This re-computation would indeed result in a good fairness bound for every single interval i, as given by equation (6). Thus, property C.1 would be satisfied. However, as we prove in the following theorem, using this approach for tag re-computation does not provide a fairness bound when looking over a sequence of time intervals. As a consequence, properties C.2 and C.3 described above are still not satisfied. But, first, we introduce the notion of controllable fairness to capture the fairness of a scheduler when weights vary dynamically.

Definition 1: For any sequence of consecutive intervals $T=(i, \ldots, i+N-1)$ during which flows f and g are constantly backlogged and weights $\phi_f(i)$ and $\phi_g(i)$ are constant within each interval i, $i \in T$, controllable fairness is defined as:

$$\sum_{i \in T} \left| \frac{W_f(i)}{\phi_f(i)} - \frac{W_g(i)}{\phi_g(i)} \right| \leq U_{f \cdot g}^* \quad (7)$$

Here, $\leq U_{f \cdot g}^*$ is the controllable fairness bound for the entire sequence of intervals.

Theorem 1: When the flow weights can vary and the tags of backlogged tasks are recomputed using equations (3)-(5) every time some weights change, then the controllable fairness is unbounded.

$$U_{f \cdot g}^* = \infty \quad (8)$$

Figure 5:
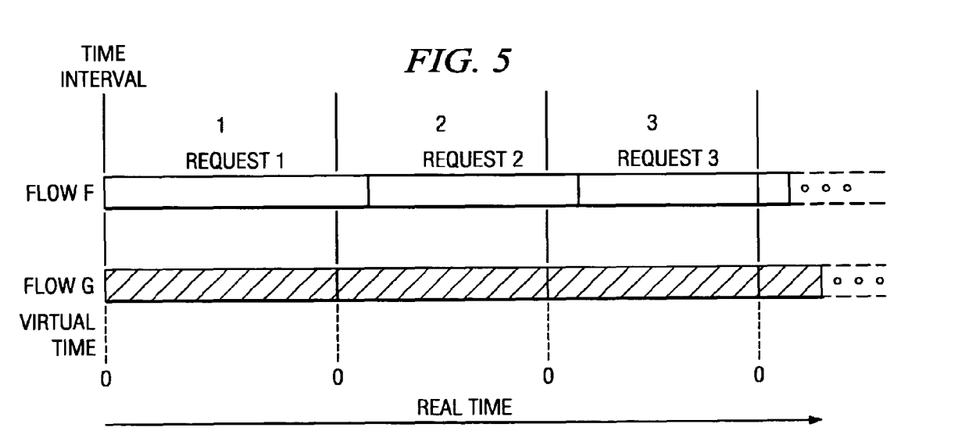
FIG. 5 shows graphs for an exemplary system having two flows, f and g, that are continuously backlogged during an infinite sequence of intervals, illustrating that it is possible in the traditional WFQ algorithm to construct an unbounded number of consecutive intervals during which there is a flow that receives no service even though it has non-zero weights.

Proof: We use a counter-example to show that $U_{f \cdot g}^*$ is unbounded as $N \to \infty$. Consider the scenario of FIG. 5. There are two flows f and g that are continuously backlogged during an infinite sequence of intervals. The start tags of the first tasks of both flows are set to 0 at the beginning of interval 1. WFQ arbitrarily picks to submit the task of f. At the beginning of interval 2 the weights are changed to some new value (the actual value does not matter in this example). At this point, the task of flow f is still not completed. Thus, virtual time is still 0. After recomputing the tags of the backlogged tasks, the start tags of the next tasks of both flows are again 0. The outstanding task from f completes during interval 2 and WFQ arbitrarily picks to submit the next task from flow f, as both have the same start tag. This pattern of execution and tag re-computation may continue for an infinite sequence of intervals. Flow f receives all the resource, while g gets nothing. Of course, such worst-case scenarios are not restricted to cases where the duration of an interval is shorter than that of a task execution. It is easy to construct similar worst-case scenarios for the case where the weight of a flow is less than 100% of the total weight but sufficient to use up entirely the resource for the duration of an interval. Theorem 1 follows directly from the above counter-example.

The intuition behind Theorem 1 is that fairness is bounded by equation (6), within each interval. However, it is possible to reach this bound at every single interval as the re-computation phase starts WFQ from scratch each time. This means that the bounds add up and thus as the length of the sequence of intervals reaches infinity $N \to \infty$, the aggregate bound becomes infinite. Thus, properties C.2 and C.3 described above are violated: there is no bound on the delay between changing flow weights and seeing the effect on performance. Because of this, there is no model with long enough "memory" that the controller could use to capture the causal relation between weight setting and performance. Moreover, whatever action the controller takes may never have any effect in the system.

Exemplary Embodiments of the Present Invention

In view of the above, a desire exists for a tag re-computation phase that results in bounded controllable fairness as $N \to \infty$. An exemplary embodiment of a WFQ proportional-share scheduler having this property is described further below. The discussion and counter examples used in describing such exemplary embodiment of a scheduler refer to resources that process one task at a time. The results are trivially applicable to depth-controlled WFQ variants (e.g., SFQ(D)) and resources that support higher degrees of concurrency, $D \geq 1$.

The problem with the naive WFQ extension in which equations (3)-(5) are used to recompute tags of backlogged tasks every time the weights change, is that it does not account for service capacity used up by tasks submitted in previous intervals. All tags are recomputed from scratch. As a result, there are cases where some flows may use the service exclusively for an infinite number of intervals, thus starving some other flows. We now propose an exemplary extension to WFQ algorithms that provably provides good controllable fairness and thus good predictability and responsiveness when the flow weights change. Again, the discussion here focuses on WFQ algorithms that emulate v(t) by the start tag of the last submitted task. In particular, we present and analyze an exemplary algorithm referred to herein as "Controllable SFQ" (or "C-SFQ" for short), which is an extension of SFQ. However, the extension is also applicable to finish-tag emulated algorithms. Accordingly, embodiments of the concepts presented herein are not limited in applicability any particular WFQ algorithm, but may be readily adapted for use with any WFQ algorithm.

With the exemplary C-SFQ, the following recursive computation is performed whenever any weights change. The computation updates the tags of the backlogged tasks of the flows for which the weight have changed. Assume, without loss of generality, that there are $Q_f$ backlogged tasks for flow f and that they are numbered from j to $j+Q_f-1$. In the following equations, i is the new interval. v(t) refers to the value of virtual time as it evolved in previous intervals, according to WFQ.

$$F(p_f^{j-1}) = S(p_f^{j-1}) + \frac{c_f^{j-1}}{\phi_f(i)} \quad (9)$$

$$S(p_f^k) = \max(v(t), F(p_f^{k-1})), \quad j \leq k < j+Q_f \quad (10)$$

$$F(p_f^k) = S(p_f^k) + \frac{c_f^k}{\phi_f(i)}, \quad j \leq k < j+Q_f \quad (11)$$

Equation (9) recomputes the finish tag of the last submitted task of flow f (in some interval before i), as if it had the new weight setting. The tags of the backlogged tasks are adjusted accordingly in equations (10) and (11) which are equivalent to (4) and (5) of WFQ. Re-computation (9) moves the start tag of the next task of f further down in time if the weight has decreased, and closer in time if it has increased. When the weights have not changed, this algorithm reduces to the original WFQ algorithm.

The intuition behind the following fairness-bound theorem for C-SFQ is that C-SFQ behaves exactly like SFQ within each interval (the virtual clocks of the flows are reset only at the beginning of an interval). Thus, the fairness bound within every single interval is the same as that of SFQ.

Theorem 2: For any sequence T of consecutive intervals during which flows f and g are constantly backlogged, the controllable fairness of C-SFQ is bounded by:

$$U^*_{f \cdot g} = \max_{i \in T} \left( \frac{c_f^{max}(i)}{\phi_f(i)} + \frac{c_g^{max}(i)}{\phi_g(i)} \right) \quad (12)$$

Proof: Assume that for each interval i there is a hypothetical SFQ execution, such that all the following apply:
1) For every flow f, the weight of this execution is constant throughout the execution and equal to the C-SFQ weight during interval i, i.e., $\phi_f^s = \phi_f(i)$ for all f.
2) At some point in time, the virtual time of the SFQ execution is equal to that of C-SFQ at the beginning of interval i, i.e., $v^s(t') = v^c(t)$.
3) At that same point in time, the finish tag of the last submitted task in the SFQ execution is equal to the re-calculated finish tag by C-SFQ at the beginning of interval i, $F^s(p_f^k) = F^c(p_f^{j-1})$ for some k and j.
4) At that same point in time, the set of backlogged tasks for all flows in the SFQ execution is the same as that in the C-SFQ case.
5) From that point in time and at least for a period of time equal to that of interval i, the SFQ scheduler receives the same sequence of tasks as those received by C.

If C-SFQ executes M steps in interval i, all those steps would be identical to the M following steps in the SFQ execution. Thus, the fairness bound of C-SFQ during interval i would be the same as that of SFQ for the same M steps.

We now show that it is always possible to construct a sequence of tasks for a hypothetical SFQ so that all the above hold. It is trivial to construct such an execution using SFQ, by submitting a task with cost $c_f^k = F^c(p_f^{j-1}) \phi_f^s$, where $\phi_f^s = \phi_f^c(i)$. This ensures that $F^s(p_f^k) = c_f^k / \phi^s = F^c(p_f^{j-1}) \phi_f^c(i) / \phi^c(i) = F^c(p_f^{j-1})$.

If at that point $v^c(t) > F^c(p_f^{j-1})$, then $v^s(t')$ can be advanced to $v^c(t)$ by sending one task from flow g where the ratio $c_g / \phi_g = v^c(t) - v^s(t')$. We do not need to consider the case where $v^c(t) \leq F^c(p_f^{j-1})$, as the max expression in equation (10) favors the $F^c(p_f^{j-1})$ term. If at this point, SFQ instantaneously receives the same set of tasks as those backlogged in the C-SFQ case at the beginning of i, their backlogged tasks will have the exact same start and finish tags.

We know that for any period of time $[t_1, t_2]$, SFQ ensures fairness bounded by $$U_{f \cdot g} = \left( \frac{c_f^{max}}{\phi_f} + \frac{c_g^{max}}{\phi_g} \right).$$

Thus, this bound holds for every single interval of an execution with C-SFQ. In fact, the fairness bound in every single interval is a function of the maximum cost of the tasks actually executed during that interval (not of the maximum cost of any task of a flow). This results in a tighter fairness bound for each interval i, defined as:

$$U^*_{f \cdot g} i = \left( \frac{c_f^{max}(i)}{\phi_f(i)} + \frac{c_g^{max}(i)}{\phi_g(i)} \right) \quad (13)$$

Thus, the fairness bound across a sequence of intervals is the worst bound among all individual intervals in the sequence, given by equation (12).

Since support for high degree of concurrency is important in many computing services, we further discuss here a depth-controllable WFQ variant. In particular, an exemplary embodiment of an algorithm referred to herein as Controllable SFQ (D) (or "C-SFQ(D)" for short) is provided, which is an extension of depth-controlled Start-tag Fair Queuing SFQ (D). As described further below, the maximum depth D is a scheduler parameter that may be desirable to be adjusted, along with flow weights, according to system and workload dynamics. It is thus desirable for a controllable scheduler to be fair even when D changes. The original fairness bound for SFQ(D) for when weights and D do not change is:

$$U_{f \cdot g} = (D+1) \left( \frac{c_f^{max}}{\phi_f} + \frac{c_g^{max}}{\phi_g} \right) \quad (14)$$

Theorem 3 below provides the controllable fairness bound for C-SFQ(D) when D as well as flow weights change between intervals. To provide that bound we first prove the following Lemma:

Lemma 1: The number of outstanding tasks during interval i, denoted D'(i) is bounded by:

$$D'_{max}(i) = \max(D(i), D(j)) \quad (15)$$

where $D(0) = 0$ and $j, j < i$ is the latest interval before i during which a task was dispatched to the service.

Proof: Consider a sequence of intervals during which all flows are constantly backlogged. Interval $j < i$ is the last interval before i during which at least one tasks is dispatched. That means that the number of outstanding tasks during f is $D'(j) = D(j)$. On the other hand, no tasks are dispatched during any interval between j and i. That is, the number of outstanding tasks in all these intervals is $D'(k) = D(j)$, for all $j \leq k < i$. There are two cases to consider for interval i:
1) If $D'(k) \leq D(i)$, there are $D(i) - D(k)$ new tasks that the scheduler can dispatch to the service in i. Thus, the maximum possible number of outstanding tasks during i is $D'_{max}(i) = D(i)$, as the flows are continuously backlogged.
2) If $D'(k) > D(i)$, a new task can be submitted only after $D'(k) - D(i) + 1$ tasks have completed. Thus, the largest possible D'(i) occurs when no task is completed in interval i. That is, the maximum possible number of outstanding tasks during i is $D'_{max}(i) = D'(k) = D(j)$.

In either case, $D'_{max}(i)$ is independent of any $D(m), m < j$.

The following theorem applies to any sequence of intervals, even sequences of infinite length.

Theorem 3: For any sequence T of consecutive intervals during which flows f and g are constantly backlogged and both D and flow weights vary between intervals, the controllable fairness of C-SFQ(D) is bounded by:

$$U^*_{f \cdot g} = \max_{i \in T} \left( (D'_{max}(i) + 1) \left( \frac{c_f^{max(i)}}{\phi_{f(i)}} + \frac{c_g^{max(i)}}{\phi_{g(i)}} \right) \right) \quad (16)$$

where $D'_{max}(i)$ is defined as in Lemma 1.

Proof: When the depth is changed between intervals, the maximum possible number of pending tasks during some interval i is given by $D'_{max}(i)$ in equation (15). According to equation (14), the bound for a specific interval i is then $$(D'_{max}(i)+1)\left(\frac{c_f^{max(i)}}{\phi_{f(i)}} + \frac{c_g^{max(i)}}{\phi_{g(i)}}\right).$$

Thus, the worst-case bound in sequence T is the highest bound of any single interval i ∈ T, as given by equation (16).

In C-SFQ(D), we now have a scheduler that is controllable, i.e., it provably satisfies all the properties C.1-C.3 identified above. As discussed further below, C-SFQ(D) can be used together with a feedback loop to achieve performance goals for a real system, whereas traditional non-controllable schedulers cannot be used in this setting. C-SFQ(D) is the etension to just one instance of a WFQ algorithm. A similar extension for controllability esists for any WFQ algorithm.

In view of the above, according to one exemplary embodiment, a weighted proportional-share algorithm is employed by a scheduler, which is controllable to maintain fairness even when weights dynamically change. An exemplary embodiment of a WFQ algorithm that may be employed by the scheduler operates according to the following pseudocode:

```
for each flow
    if no change in weight
        return
    else
        for each single request in the queue
            if first request
                recompute tags according to equations (9) and (10)
            else
                recompute tags according to equations (10) and (11)
            endif
    endif
```

In the above exemplary WFQ algorithm, a determination is made whether a change in weight is received for any flow (or "consumer") in the system. If not, the WFQ algorithm functions as normal to allocate shares of the resource to the flows based on their respective weights. However, if a weight change is received for one or more of the flows, then for each request in the queue, the WFQ's tags are recomputed. If the request is then first request in the queue, the tags are recomputed according to equations (9) and (10); otherwise, the tags are recomputed according to equations (10) and (11).

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information. Thus, the exemplary operations described above (e.g., the flows of FIGS. 2A-2B) may be implemented in a system via computer-executable software code. The software code may run on any suitable processor-based system, such as the exemplary system of FIG. 1.

Embodiments described above may be employed to address the problem of enforcing application-level performance goals in shared computing infrastructures, for example. The parameters of a weighted proportional-share schedulers can be dynamically varied using adaptive feedback-based control. Embodiments of the present invention may be employed to maintain controllable fairness in the weighted proportional-share schedulers (e.g., WFQ schedulers) even as the parameters (e.g., weight) are dynamically varied. For instance, in certain embodiments, a tag adjustment algorithm is provided that ensures that WFQ schedulers are controllably-fair even when scheduler parameters, such as weight, dynamically vary.

What is claimed is:

1. A method comprising:
receiving at a scheduler, executed by a processor-based system, a change to a weight assigned to a particular consumer; and
utilizing, by said scheduler, a weighted proportional-share scheduling algorithm to maintain fairness in allocating shares of a resource to competing consumers in accordance with the changed weight,
wherein said weighted proportional-share scheduling algorithm comprises a weighted fair queuing (WFQ) algorithm,
wherein said competing consumers comprise competing flows, wherein a flow is a sequence of tasks desiring to use said resource,
wherein said tasks are grouped into service classes forming corresponding flows, and
wherein said utilizing said weighted proportional-share scheduling algorithm to maintain fairness comprises:
said weighted proportional-share scheduling algorithm recomputing at least one parameter associated with a queued task of the particular consumer.

2. The method of claim 1 wherein said utilizing said weighted proportional-share scheduling algorithm to maintain fairness comprises:
utilizing said weighted proportional-share scheduling algorithm to maintain, within a defined tolerance that is bounded by a constant over any time interval, allocation of shares of said resource to the competing consumers proportionally to respective weights assigned to the competing consumers.

3. The method of claim 1 wherein said recomputing the at least one parameter comprises:
changing one or both of a start tag and finish tag for the queued task, wherein the start tag specifies a start time for the queued task and the finish tag specifies a finish time for the queued task.

4. The method of claim 1 wherein said receiving comprises:
receiving from a controller said change to said weight.

5. The method of claim 4 further comprising:
said controller monitoring performance of said competing consumers and determining said change to said weight based at least in part on said performance.

6. The method of claim 1 wherein said sequence of tasks comprise one or more of the following:
network packets, instructions, threads competing for a CPU, application-level requests, Remote Procedure Calls and I/O requests.

7. A method comprising:
receiving at a scheduler, executed by a processor-based system, a change to a weight assigned to a consumer; and
utilizing, by said scheduler, a weighted fair queuing (WFQ) algorithm to maintain fairness in allocating shares of a resource to competing consumers in accordance with the changed weight, wherein said utilizing said weighted fair queuing WFQ algorithm to maintain fairness comprises:

recomputing an internal state of said WFQ algorithm responsive to the received weight change, wherein said recomputing said internal state comprises, for each single request in a queue of said WFQ:

if the request is a first request in the queue, then recompute tags according to $$F(p_f^{j-1}) = S(p_f^{j-1}) + \frac{c_f^{j-1}}{\phi_f(i)}$$

and $$S(p_f^k) = \max(v(t), F(p_f^{k-1})), \quad j \le k < j + Q_f;$$

if the request is not a first request in the queue, then recompute tags according to $$S(p_f^k) = \max(v(t), F(p_f^{k-1})), \quad j \le k < j + Q_f$$

and $$F(p_f^k) = S(p_f^k) + \frac{c_f^k}{\phi_f(i)}, \quad j \le k < j + Q_f,$$

where there are $Q_f$ backlogged tasks for flow f and the tasks $p_f$ are numbered from j to $j+Q_f-1$, i is a new interval, v(t) refers to the value of virtual time as it evolved in previous intervals, $c_f^{j-1}$ or $c_f^k$ represents cost of a task, $\phi_f(i)$ represents a weight of flow f of during interval i, F( ) is a finish tag, and S( ) is a start tag.

8. A method comprising:

receiving at a scheduler, executed by a processor-based system, a change to a weight assigned to a consumer; and utilizing, by said scheduler, a weighted proportional-share scheduling algorithm to maintain fairness in allocating shares of a resource to competing consumers in accordance with the changed weight, wherein said weighted proportional-share scheduling algorithm provides controllable fairness as defined by the following:

for any sequence of consecutive intervals T=(i, ..., i+N−1) during which flows f and g are constantly backlogged and weights $\phi_f(i)$ and $\phi_g(i)$ are constant within each interval i, i ∈ T, controllable fairness is defined as $$\sum_{i \in T} \left| \frac{W_f(i)}{\phi_f(i)} - \frac{W_g(i)}{\phi_g(i)} \right| \le U_{f,g}^*,$$

where $W_f(i)$ represents an aggregate cost of tasks from flow f served during time interval i, and $W_g(i)$ represents an aggregate cost of tasks from flow g served during time interval i.

9. A method comprising:

allocating, by a scheduler executed by a processor-based system, shares of a resource to competing consumers, wherein said allocating is performed by said scheduler using a weighted fair queuing (WFQ) algorithm;

monitoring, by a controller executed by the processor-based system, performance of said competing consumers;

based at least in part on said monitored performance, said controller dynamically changing a scheduler parameter, wherein said scheduler parameter that is changed comprises one or both of a) a weight assigned to at least one of said competing consumers and b) degree of concurrency in the resource;

responsive to said dynamically changed scheduler parameter, said WFQ algorithm recomputing at least one parameter associated with a queued task of the at least one consumer to maintain fairness in performing said allocating.

10. The method of claim 9 wherein said dynamically changing said scheduler parameter comprises instructing said scheduler to change said scheduler parameter.

11. The method of claim 9 wherein said WFQ algorithm maintaining fairness in performing said allocating comprises:

said WFQ algorithm maintaining, within a defined tolerance that is bounded by a constant over any time interval, allocation of shares of the resource to the competing consumers proportionally to respective weights assigned to the competing consumers.

12. The method of claim 9 wherein recomputing the at least one parameter associated with the queued task comprises:

changing one or both of a start tag and finish tag for the queued task, wherein the start tag specifies a start time for the queued task and the finish tag specifies a finish time for the queued task.

13. A system comprising:

at least one processor;

at least one resource;

a plurality of competing consumers desiring to use said at least one resource;

a scheduler executable by the at least one processor to allocate shares of said at least one resource to said competing consumers according to a weighted proportional-share algorithm;

a controller executable by the at least one processor to monitor one or both of performance of said competing consumers and utilization of said at least one resource, and to control said one or both of performance of said competing consumers and utilization of said at least one resource by dynamically changing a scheduler parameter, wherein said scheduler parameter that is dynamically changed comprises one or both of a) a weight assigned to at least one of said competing consumers and b) degree of concurrency in the at least one resource; and wherein said scheduler is operable to maintain fairness in allocating said shares of said at least one resource to said competing consumers in accordance with said dynamically changed scheduler parameter by recomputing at least one parameter associated with a backlogged task of the at least one consumer.

14. The system of claim 13 wherein maintaining said fairness in allocating comprises:

maintaining within a defined tolerance that is bounded by a constant over any time interval, allocation of said shares of the at least one resource to the competing consumers proportionally to respective weights assigned to the competing consumers.

15. The system of claim 13 wherein said at least one parameter associated with the backlogged task comprises:

one or both of a start tag and finish tag for the backlogged task, wherein the start tag specifies a start time for the backlogged task and the finish tag specifies a finish time for the backlogged task.

16. The system of claim 13 wherein said weighted proportional-share algorithm comprises a weighted fair queuing (WFQ) algorithm.

17. The system of claim 13 wherein said at least one resource comprises a physical resource.

18. The system of claim 17 wherein said physical resource comprises at least one of the following: CPU cycles, disk I/O, and network bandwidth.

19. The system of claim 13 wherein said at least one resource comprises a virtual resource.

20. The system of claim 19 wherein said virtual resource comprises at least one of the following: web server bandwidth, and database transactions per second.

21. A system comprising:

at least one processor;

means including the at least one processor for allocating proportional shares of a system resource to competing consumers according to relative weights assigned to said competing consumers; and means including the at least one processor for adapting said allocating responsive to a change in said relative weights to maintain, within a defined tolerance that is bounded by a constant over any time interval, allocation of shares of the system resource to the competing consumers proportionally to said relative weights, wherein said means for adapting recomputes at least one parameter associated with a backlogged task associated with a consumer for which a corresponding relative weight has been changed, wherein said competing consumers comprise competing flows, wherein a flow is a sequence of tasks desiring to use said system resource, and wherein said tasks are grouped into service classes forming corresponding flows, wherein said means for allocating comprises a weighted fair queuing (WFQ) algorithm.

22. The system of claim 21 wherein said at least one parameter comprises:

one or both of a start tag and a finish tag for the backlogged task, wherein the start tag specifies a start time for the backlogged task and the finish tag specifies a finish time for the backlogged task.

* * * * *